(12) United States Patent
Clos et al.

(10) Patent No.: US 11,066,168 B2
(45) Date of Patent: Jul. 20, 2021

(54) AIRCRAFT CARGO ROLLER PANEL

(71) Applicant: THE BOEING COMPANY, Chicago, IL (US)

(72) Inventors: William R. Clos, Mukilteo, WA (US); Darrin M. Noe, Arlington, WA (US)

(73) Assignee: The Boeing Company, Chicago, IL (US)

( * ) Notice: Subject to any disclaimer, the term of this patent is extended or adjusted under 35 U.S.C. 154(b) by 321 days.

(21) Appl. No.: 16/100,459

(22) Filed: Aug. 10, 2018

(65) Prior Publication Data
US 2020/0047887 A1 Feb. 13, 2020

(51) Int. Cl.
*B64D 9/00* (2006.01)
*B64D 45/00* (2006.01)
*G06K 7/10* (2006.01)

(52) U.S. Cl.
CPC ............. *B64D 9/00* (2013.01); *B64D 45/00* (2013.01); *B64D 2009/006* (2013.01); *B64D 2045/0075* (2013.01); *G06K 7/10297* (2013.01)

(58) Field of Classification Search
CPC .......... G01G 19/08; B64D 9/00; B64D 9/003; B64D 45/00; B64D 2045/0075; G06K 7/10297; B64C 1/22
See application file for complete search history.

(56) References Cited

U.S. PATENT DOCUMENTS

| | | | | | |
|---|---|---|---|---|---|
| 3,584,503 | A | * | 6/1971 | Senour | G01G 19/07 73/65.06 |
| 3,701,279 | A | * | 10/1972 | Harris | G01M 1/125 73/65.06 |
| 4,225,926 | A | * | 9/1980 | Wendt | B64D 9/00 701/124 |
| 4,446,524 | A | * | 5/1984 | Wendt | B64D 9/00 701/124 |
| 6,308,131 | B1 | * | 10/2001 | Fox | B64D 9/00 701/124 |
| 7,100,827 | B2 | * | 9/2006 | Olin | B64D 9/003 235/385 |
| 8,185,234 | B2 | * | 5/2012 | Tietjen | G01G 19/07 700/219 |
| 10,005,564 | B1 | * | 6/2018 | Bhatia | B64C 1/22 |
| 10,210,473 | B2 | * | 2/2019 | Arora | B64D 9/00 |
| 10,589,872 | B1 | * | 3/2020 | Sundararaj | G01G 19/62 |
| 2006/0038077 | A1 | * | 2/2006 | Olin | B64D 9/00 244/137.1 |

(Continued)

FOREIGN PATENT DOCUMENTS

| | | |
|---|---|---|
| CN | 102538917 B | 8/2014 |
| EP | 2993126 A1 | 3/2016 |

(Continued)

OTHER PUBLICATIONS

Extended European Search Report dated Dec. 12, 2019, issued in corresponding Application No. EP19190697, 7 pgs.

*Primary Examiner* — Natalie Huls

(57) ABSTRACT

A method includes receiving, at a controller, a signal from each load cell of a plurality of load cells coupled to an aircraft cargo roller panel of an aircraft. Each signal is indicative of a load experienced by the load cell when cargo is on the aircraft cargo roller panel. The method also includes determining, based on the signals, a weight of the cargo, a center of gravity of the cargo, or both.

20 Claims, 8 Drawing Sheets

(56) References Cited

U.S. PATENT DOCUMENTS

| | | | | |
|---|---|---|---|---|
| 2009/0304482 | A1* | 12/2009 | Sanford | B64D 9/00 |
| | | | | 414/495 |
| 2010/0131182 | A1* | 5/2010 | Deegan | G01G 19/08 |
| | | | | 701/124 |
| 2017/0045394 | A1* | 2/2017 | Fuss | B64D 9/00 |
| 2017/0315014 | A1* | 11/2017 | Regan | G01M 1/125 |
| 2018/0290844 | A1* | 10/2018 | Lewis | B60P 1/022 |
| 2020/0124463 | A1* | 4/2020 | Daw Perez | G01G 19/086 |
| 2020/0172236 | A1* | 6/2020 | George | B64D 27/02 |

FOREIGN PATENT DOCUMENTS

| | | |
|---|---|---|
| FR | 2415041 A1 | 8/1979 |
| FR | 2460841 A1 | 1/1981 |
| WO | 2006074908 A1 | 7/2006 |

\* cited by examiner

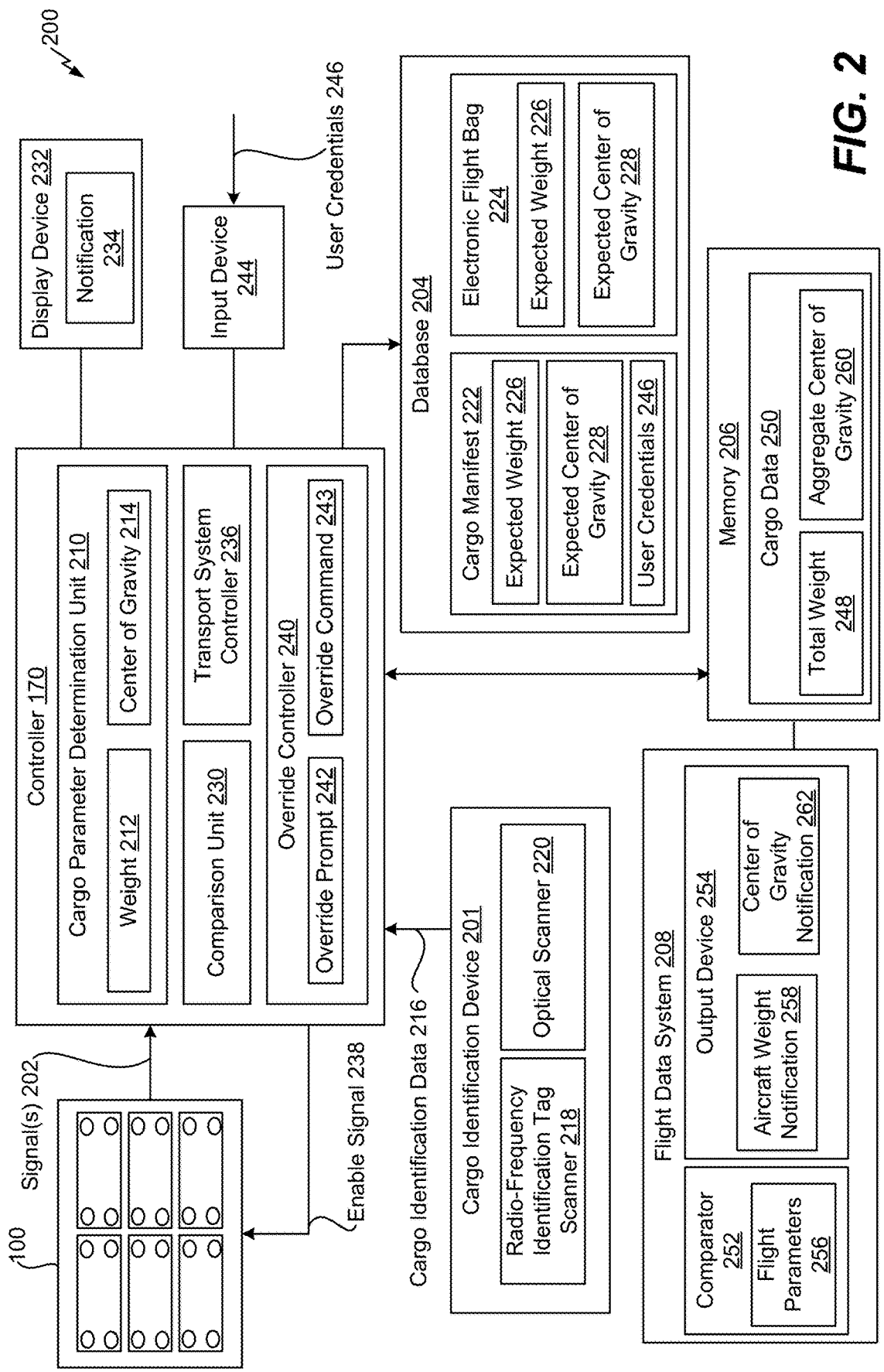

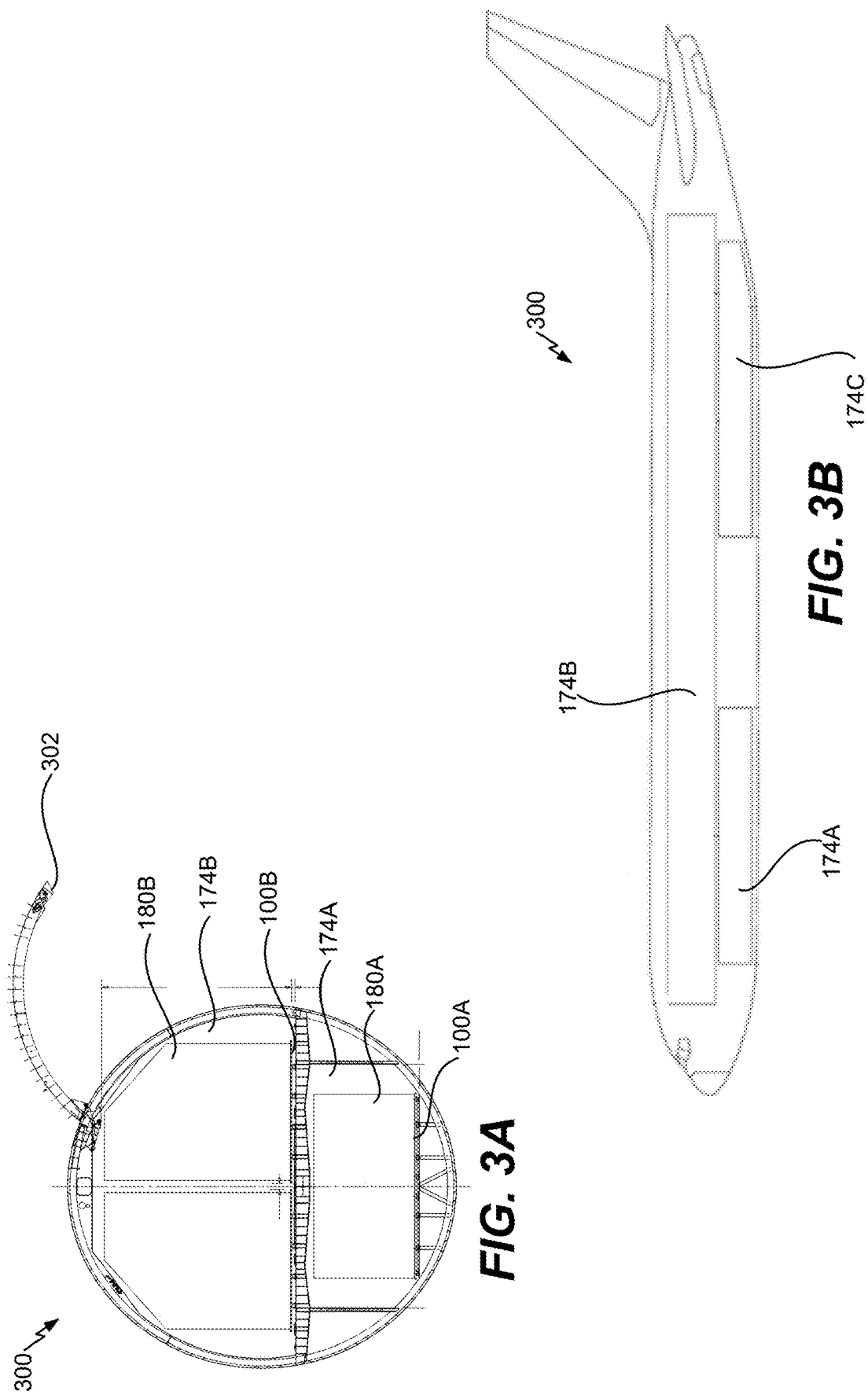

| | Expected | Actual | Reject or Accept Decision |
|---|---|---|---|
| Aircraft Cargo Weight | 12,060.40 lbs | 13,446.40 lbs | Accept John Doe (38792) |
| Aircraft Cargo Center of Gravity | Not Specified | 6% Offset | Center of Gravity Acceptable |
| Total Weight in Cargo Hold | 139,425 lbs | 141,818.60 lbs | Total Weight Acceptable (Acceptability Based on Percentage Difference) |

AIRCRAFT CARGO ROLLER PANEL

FIELD OF THE DISCLOSURE

The present disclosure is related to an aircraft cargo panel.

BACKGROUND

An aircraft includes one or more compartments that are used to store aircraft cargo during a flight. For example, the one or more compartments can store cargo containers, cargo pallets, etc. Typically, each cargo container or cargo pallet is weighed prior to being loaded on the aircraft. As a non-limiting example, a freight worker can load a particular cargo container in a warehouse, weigh the particular cargo container in the warehouse, and record the weight for use in developing the aircraft load and trim sheet, load schedule, load manifest, load plan, or other similar documents. In this example, after the weight of the particular cargo container is recorded, someone could put additional freight inside the particular cargo container. As another example, a freight company could intentionally under-report the weight of aircraft cargo to reduce the cost of shipping the aircraft cargo.

In addition to changing the weight of the particular cargo container, the additional freight can change the center of gravity of the particular cargo container. The center of gravity of cargo containers and pallets is used to determine the number of restraints that are needed to hold cargo in place during flight. For example, additional restraints (e.g., supplementary cargo restraint straps) may be needed to hold the particular cargo container in place if the aircraft experiences turbulence and if the center of gravity exceeds a limit or offset set by the Airplane Weight and Balance Manual.

SUMMARY

According to one implementation of the present disclosure, an aircraft includes an aircraft cargo roller panel configured to facilitate loading aircraft cargo into a compartment of the aircraft. The aircraft also includes a plurality of load cells coupled to the aircraft cargo roller panel. Each load cell of the plurality of load cells is configured to generate a signal indicative of a load experienced by the load cell when cargo is on the aircraft cargo roller panel. The aircraft further includes a controller configured to receive signals from the plurality of load cells and to determine, based on the signals, a weight of the cargo, a center of gravity of the cargo, or both.

According to another implementation of the present disclosure, a method includes receiving, at a controller, a signal from each load cell of a plurality of load cells coupled to an aircraft cargo roller panel of an aircraft. Each signal is indicative of a load experienced by the load cell when cargo is on the aircraft cargo roller panel. The method also includes determining, based on the signals, a weight of the cargo, a center of gravity of the cargo, or both.

According to another implementation of the present disclosure, an aircraft cargo roller panel includes a plurality of omnidirectional rollers configured to facilitate loading aircraft cargo into a compartment of an aircraft. The aircraft cargo roller panel also includes a plurality of load cells. Each load cell of the plurality of load cells is configured to generate a load signal indicative of a load experienced by the load cell when cargo is on the plurality of omnidirectional rollers and to send the load signal to a controller. The aircraft cargo roller panel also includes one or more motive devices configured to selectively engage, responsive to a control signal from the controller, the cargo to move the cargo within the compartment. The control signal is generated responsive to the load signals.

One advantage of the above-described implementation is an ability to verify whether aircraft cargo is compliant with reported parameters on an aircraft load and trim sheet or other similar document when the aircraft cargo is loaded on an aircraft. For example, the aircraft cargo is placed onto an aircraft cargo roller panel that includes multiple load cells. Based on a load experienced by each load cell, a controller can determine a weight of the aircraft cargo and a center of gravity of the aircraft cargo while the aircraft cargo is on the aircraft cargo roller panel. If the weight and the center of gravity are compliant with a reported weight and center of gravity in the aircraft load and trim sheet or other similar document, the aircraft cargo roller panel loads the aircraft cargo into a compartment of the aircraft. However, if the weight or the center of gravity is not compliant, crew members may be alerted. Additionally, the features, functions, and advantages that have been described can be achieved independently in various implementations or may be combined in yet other implementations, further details of which are disclosed with reference to the following description and drawings.

BRIEF DESCRIPTION OF THE DRAWINGS

FIG. 2 is a diagram of a system that is operable to determine parameters of aircraft cargo as the aircraft cargo is loaded in an aircraft;

FIG. 3A is a diagram of a cross-sectional view of an aircraft that includes the aircraft cargo roller panel of FIG. 1A;

FIG. 3B is a diagram of a side view of the aircraft of FIG. 3A;

DETAILED DESCRIPTION

Figure 1A:
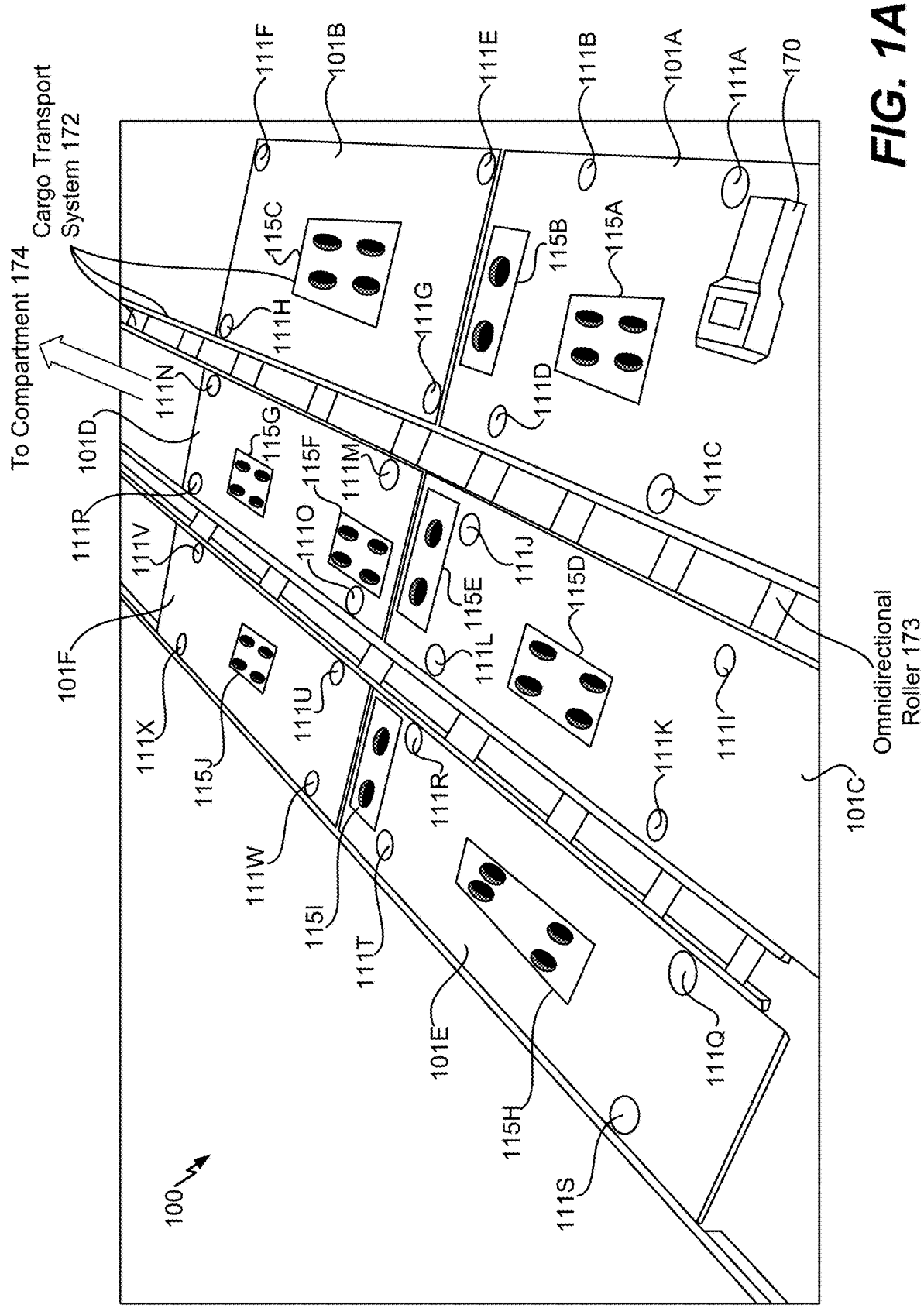
FIG. 1A is a diagram of an aircraft cargo roller panel that is operable to determine parameters of aircraft cargo as the aircraft cargo is loaded in an aircraft.

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation.

As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1A, multiple load cells are illustrated and associated with reference numbers 111A, 111B, 111C, etc. When referring to a particular one of these load cells, such as the load cell 111A, the distinguishing letter "A" is used. However, when referring to any arbitrary one of these load cells or to these load cells as a group, the reference number 111 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

The techniques described herein enable an aircraft system to verify, while the aircraft cargo is loaded on an aircraft, whether a weight and a center of gravity of the aircraft cargo is compliant with reported parameters. To illustrate, an aircraft cargo roller panel within the aircraft is configured to receive cargo and transport the cargo within a compartment of the aircraft for storage. For example, when the cargo is placed onto the aircraft cargo roller panel, motive devices coupled to the aircraft cargo roller panel can engage the cargo and move the cargo within the compartment. To illustrate, the motive devices can include wheels or movable clamps that elevate from within the aircraft cargo roller panel to move the cargo. The motive devices can be automated such that the motive devices are responsive to a control signal to engage the cargo and move the cargo within the compartment.

Multiple load cells are coupled to the aircraft cargo roller panel. When the cargo is placed on the aircraft cargo roller panel, each load cell is configured to generate a signal indicative of a load experienced by the load cell. For example, each load cell can include (or correspond to) a measuring unit that measures the corresponding load (e.g., weight) experienced by the load cell. The signals generated by the load cells are provided to a controller. The controller determines a weight of the cargo based on the signals generated by the load cells. For example, the loads experienced by the load cells can be summed at the controller to determine the weight of the cargo. Additionally, the controller can determine a center of gravity of the cargo based on the loads experienced by the load cells. For example, the center of gravity can be determined based on the location of each load cell and the load experienced by each load cell due to the cargo. If the weight and the center of gravity are compliant with a reported weight and center of gravity in the aircraft load and trim sheet or other similar documents, the aircraft cargo roller panel loads the aircraft cargo within the compartment for storage. For example, the controller generates a control signal to enable the motive devices to engage the cargo and transport the cargo within the compartment. However, if the weight or the center of gravity is not compliant, one or more crew members (e.g. aircrew members or ground crew members) may be alerted. In one implementation, a crew member can override a non-compliance determination by entering employee identification information into the controller. Upon overriding the non-compliance determination, the motive devices engage the cargo and transport the cargo within the compartment for storage.

The controller can monitor the aggregate weight of the cargo loaded in the compartment. For example, as cargo is accepted by the controller based on weight and center of gravity parameters and transported within the compartment, the controller can update a record of the weight of the cargo in the compartment. If the aggregate weight of the loaded cargo is heavier than an allowable weight, the crew can be notified. Thus, as further described below, the techniques described herein enable aircraft systems to monitor and verify parameters (e.g., a weight and a center of gravity) of cargo as the cargo is loaded on to the aircraft. Monitoring and verifying the parameters may enable crew to have a more accurate account of the cargo on the aircraft.

Figure 1B:
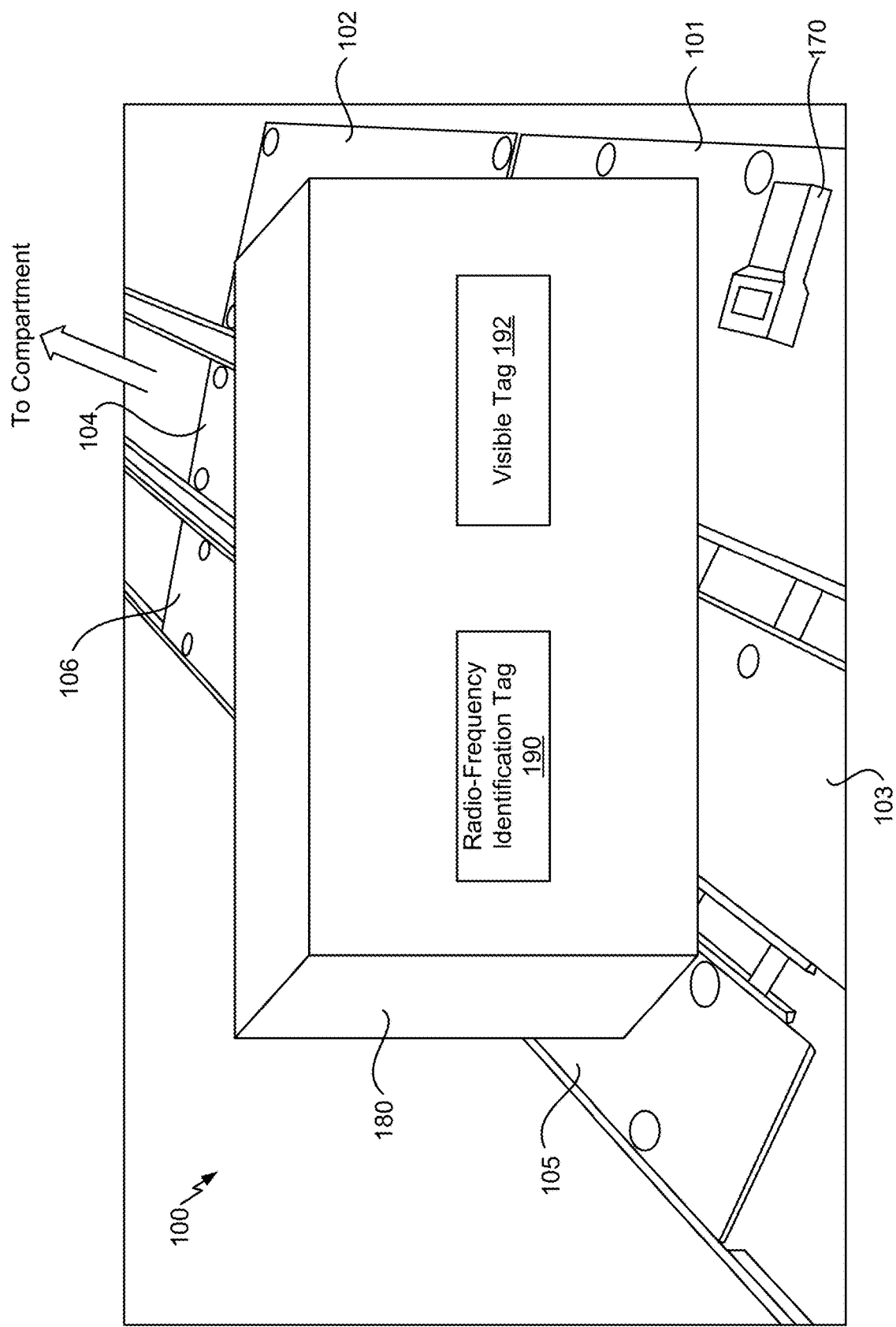
FIG. 1B is a diagram of aircraft cargo placed on the aircraft cargo roller panel of FIG. 1A.

FIG. 1A is a diagram of an aircraft cargo roller panel 100 that is operable to determine parameters of aircraft cargo as the aircraft cargo is loaded in an aircraft. For example, the aircraft cargo roller panel 100 includes components that enable a weight of aircraft cargo and a center of gravity of aircraft cargo to be determined when the aircraft cargo is loaded on to the aircraft. Additionally, the aircraft cargo roller panel 100 is configured to facilitate loading aircraft cargo into a compartment 174 of an aircraft. For example, referring to FIG. 1B, aircraft cargo 180 can be placed on top of the aircraft cargo roller panel 100. In one implementation, a radio-frequency identification (RFID) tag 190 is attached to the aircraft cargo 180. The RFID tag 190 can be scanned by a RFID scanner to identify the aircraft cargo 180. In another implementation, a visible tag 192 (e.g., a barcode) is attached to the aircraft cargo 180. The visible tag 192 can be scanned by an optical scanner to identify the aircraft cargo 180. As explained below, components of the aircraft cargo roller panel 100 can transport the aircraft cargo 180 into the compartment 174 of the aircraft.

Referring back to FIG. 1A, the aircraft cargo roller panel 100 includes multiple sub-panels 101A-101F (e.g., omnidirectional roller panels). For example, the aircraft cargo roller panel 100 includes a sub-panel 101A, a sub-panel 101B, a sub-panel 101C, a sub-panel 101D, a sub-panel 101E, and a sub-panel 101F. Although six sub-panels 101A-101F are illustrated in FIG. 1, in other implementations, the aircraft cargo roller panel 100 can include additional (or fewer) sub-panels. According to one implementation, the aircraft cargo roller panel 100 can include a single panel (e.g., no sub-panels) or at least two sub-panels. Each panel includes one or more omnidirectional rollers.

The aircraft cargo roller panel 100 includes one or more load cells 111 that are configured to generate signals indicative of a corresponding experienced load when the aircraft cargo 180 is on the aircraft cargo roller panel 100. In FIG. 1A, a load cell 111A, a load cell 111B, a load cell 111C, and a load cell 111D are coupled to the sub-panel 101A. Additionally, in FIG. 1A, a load cell 111E, a load cell 111F, a load cell 111G, and a load cell 111H are coupled to the sub-panel 101B. In addition, in FIG. 1A, a load cell 111I, a load cell 111J, a load cell 111K, and a load cell 111L are coupled to the sub-panel 101C. A load cell 111M, a load cell 111N, a load cell 111O, and a load cell 111P are coupled to the sub-panel 101D. A load cell 111Q, a load cell 111R, a load cell 111S, and a load cell 111T are coupled to the sub-panel 101E. A load cell 111U, a load cell 111V, a load cell 111W, and a load cell 111X are coupled to the sub-panel 101F. Each load cell 111 is configured to generate a signal indicative of a load experienced by the load cell 111 when cargo, such as the aircraft cargo 180, is on the aircraft cargo roller panel 100.

The aircraft cargo roller panel 100 also includes one or more motive devices 115 that are configured to engage the aircraft cargo 180 to move the aircraft cargo 180 within the compartment 174. For example, the sub-panel 101A includes a motive device 115A and a motive device 115B, the sub-panel 101B includes a motive device 115C, the sub-panel 101C includes a motive device 115D and a motive device 115E, the sub-panel 101D includes a motive device 115F and a motive device 115G, the sub-panel 101E includes a motive device 115H and a motive device 115I, and the sub-panel 101F includes a motive device 115J. The motive devices 115 are associated with a cargo transport system 172 that is configured to move the aircraft cargo 180 within the compartment 174. For example, the motive devices 115 can include wheels and motors to transport the aircraft cargo 180 within the compartment 174 of the aircraft. Each motive device 115 can engage (or connect onto) the aircraft cargo 180 and transport the aircraft cargo 180 within the compartment 174.

During operation, a ground crew can place the aircraft cargo 180 on the aircraft cargo roller panel 100 so that the aircraft cargo roller panel 100 can load the aircraft cargo 180 in to the compartment 174. Each load cell 111 measures a load experienced due to the aircraft cargo 180 when the aircraft cargo 180 is placed on the aircraft cargo roller panel 100. As a non-limiting example, as a result of placing the aircraft cargo 180 on the aircraft cargo roller panel 100, the load cell 111A can experience a fifty pound load, the load cell 111B can experience a forty pound load, the load cell 111C can experience a sixty pound load, and the load cell 111D can experience a sixty pound load. Thus, in the above example, the load attributed to the sub-panel 101A is two hundred and ten pounds. Each load cell 111 can generate a signal indicative of the load experienced and provide the signal to a controller 170.

Additionally, the load cells 111 coupled to the other sub-panels 101B-101F can also generate signals indicative of the load experienced and provide the signals to the controller 170. In some implementations, different aircraft cargo can be placed on different sub-panels 101A-101F so that multiple aircraft cargoes can be weighed and processed (e.g., transported within the compartment 174) concurrently.

The controller 170 is configured to receive the signals from the load cells 111 coupled to the aircraft cargo roller panel 100 and to determine, based on the signals, a weight of the aircraft cargo 180, a center of gravity of the aircraft cargo 180, or both. For example, the controller 170 can determine the sum of the loads experienced by the load cells 111 when the aircraft cargo 180 is placed on the aircraft cargo roller panel 100 to determine the weight of the aircraft cargo 180. In the above scenario, the sum of the loads experienced by the load cells 111 is approximately equal to the weight of the aircraft cargo 180.

Additionally, the controller 170 can use load cell position information to determine a location of the center of gravity of the aircraft cargo 180. As a non-limiting example, the controller 170 can use the load cell position information to determine a distance of each load cell 111 from a datum (e.g., an arbitrary starting point) and can multiply the load experienced by each load cell 111 by the corresponding distance to determine a moment for each load cell 111. The sum of the moments can be divided by weight of the aircraft cargo 180 to determine a distance between the datum and the center of gravity of the aircraft cargo 180. The controller 170 can determine the location of the center of gravity based on the distance.

As described in greater detail below, the controller 170 is configured to perform a comparison of the weight of the aircraft cargo 180, the center of gravity of the aircraft cargo 180, or both to acceptance criteria. The acceptance criteria is based on information in a cargo manifest or an electronic flight bag. For example, the cargo manifest (or the electronic flight bag) can indicate an expected weight of the aircraft cargo 180, an expected center of gravity of the aircraft cargo 180, or both. If a difference between the weight of the aircraft cargo 180 and the expected weight of the aircraft cargo 180 in the cargo manifest satisfies a weight difference threshold, the controller 170 can determine to accept the aircraft cargo 180. However, if the difference between the weight of the aircraft cargo 180 and the expected weight of the aircraft cargo 180 fails to satisfy the weight difference threshold, the controller 170 can reject the aircraft cargo 180 or alert a crew member. Additionally, or in the alternative, if a difference between the center of gravity of the aircraft cargo 180 and the expected center of gravity of the aircraft cargo 180 in the cargo manifest satisfies a center of gravity difference threshold, the controller 170 can determine to accept the aircraft cargo 180. However, if the difference between the center of gravity of the aircraft cargo and the expected center of gravity of the aircraft cargo 180 fails to satisfy the center of gravity difference threshold, the controller 170 can reject the aircraft cargo 180 or alert the crew member.

If the controller 170 accepts the aircraft cargo 180, the motive devices 115 can engage the aircraft cargo 180, and the cargo transport system 172 (which includes the motive devices 115, omnidirectional rollers 173, and rails coupled to the sub-panels 101A-101F) can move the aircraft cargo 180 within the compartment 174. For example, the controller 170 can selectively enable the cargo transport system 172 in response to a determination to accept the aircraft cargo 180 based on the weight of the aircraft cargo 180, the center of gravity of the aircraft cargo 180, or both.

Thus, the load cells 111 on the aircraft cargo roller panel 100 enables the controller 170 to verify whether the aircraft cargo 180 is compliant with reported parameters (e.g., the expected weight of the aircraft cargo 180, the expected center of gravity of the aircraft cargo 180, or both) on the cargo manifest. For example, based on a load experienced by each load cell 111, the controller 170 can determine the weight of the aircraft cargo 180 and the center of gravity of the aircraft cargo 180 while the aircraft cargo 180 is on the aircraft cargo roller panel 100. If the weight and the center of gravity are compliant with a reported weight and center of gravity in the cargo manifest, the cargo transport system 172 transports the aircraft cargo 180 within the compartment 174. However, if the weight or the center of gravity is not compliant, aircrew may be alerted.

FIG. 2 is a diagram of a system 200 that is operable to determine parameters of aircraft cargo as the aircraft cargo is loaded in an aircraft. The system 200 includes the aircraft cargo roller panel 100, the controller 170, a cargo identification device 201, a database 204, a memory 206, a flight data system 208, a display device 232, and an input device 244.

Each load cell 111 coupled to the aircraft cargo roller panel 100 can generate a signal 202 (e.g., a load signal) that is indicative of a load experienced by the load cell 111 when the aircraft cargo 180 is on the aircraft cargo roller panel 100. The signals 202 are provided to the controller 170, and the controller 170 is configured to determine a weight 212 of the aircraft cargo 180 and a center of gravity 214 of the aircraft cargo 180 based on the signals 202. For example, the controller 170 includes a cargo parameter determination unit 210 that is configured to determine the weight 212 and the center of gravity 214 of the aircraft cargo 180 based on the measured loads of the load cells 111. To illustrate, the cargo parameter determination unit 210 can determine the sum of the load experienced by the load cells 111 when the aircraft cargo 180 is placed on the aircraft cargo roller panel 100 to determine the weight 212. Additionally, or in the alternative, in a similar manner described above, the cargo parameter determination unit 210 can use load cell position information and the signals 202 to determine the center of gravity 214. For example, the cargo parameter determination unit 210 can use the load cell position information to determine the distance of each load 111 cell from a datum (e.g., an arbitrary starting point) and can multiply the load experienced by each load cell 111 by the corresponding distance to determine the moment for each load cell 111. The sum of the moments can be divided by weight 212 to determine the distance between the datum and the center of gravity 214. The cargo parameter determination unit 210 can determine the center of gravity 214 based on the distance.

The cargo identification device 201 is configured to generate cargo identification data 216 associated with the aircraft cargo 180 and send the cargo identification data 216 to the controller 170. For example, in FIG. 2, the cargo identification device 201 includes a radio-frequency identification (RFID) tag scanner 218, an optical scanner 220, or both. According to one implementation, the RFID tag scanner 218 is configured to scan the RFID tag 190 attached to the aircraft cargo 180 to generate the cargo identification data 216. According to another implementation, the optical scanner 220 is configured scan the visible tag 192 attached to the aircraft cargo 180 to generate the cargo identification data 216.

The controller 170 is configured to access at least one of a cargo manifest 222 or an electronic flight bag 224 from a database 204 to determine an expected weight 226 of the aircraft cargo 180, an expected center of gravity 228 of the aircraft cargo 180, or both. For example, the cargo manifest 222 (or the electronic flight bag 224) can include expected weights for aircraft cargo that is to be loaded on the aircraft, expected centers of gravity for aircraft cargo that is to be loaded on the aircraft, or both. The expected weights and the expected centers of gravity can be reported by freight workers prior to the aircraft cargo arriving at the aircraft. Based on the cargo identification data 216, the controller 170 can access the expected weight 226 for the aircraft cargo 180 from the expected weights in the cargo manifest 222 (or the electronic flight bag 224) and can access the expected center of gravity 228 from the expected centers of gravity in the cargo manifest 222 (or the electronic flight bag 224).

The controller 170 is configured to perform a comparison of the weight 212 of the aircraft cargo 180, the center of gravity 214 of the aircraft cargo 180, or both, to acceptance criteria. The acceptance criteria can be based on the expected weight 226 of the aircraft cargo 180, the expected center of gravity 228 of the aircraft cargo 180, or both. As a non-limiting example, the acceptance criteria can include a weight difference threshold based on the expected weight 226 of the aircraft cargo 180. As another non-limiting example, the acceptance criteria can include a center of gravity difference threshold based on the expected center of gravity 228 of the aircraft cargo 180. Based on a result of the comparison, the controller 170 can determine whether to accept the aircraft cargo 180.

To illustrate, the controller 170 identifies the aircraft cargo 180 on the aircraft cargo roller panel 100 based on the cargo identification data 216, and the controller 170 identifies the expected weight 226 of the aircraft cargo 180 from the cargo manifest 222. A comparison unit 230 compares the weight 212 (e.g., the controller 170 determined weight) of the aircraft cargo 180 to the expected weight 226 of the aircraft cargo 180. If a difference between the weight 212 and the expected weight 226 satisfies (e.g., is less than) the weight difference threshold, the aircraft cargo 180 is accepted. Thus, the cargo is accepted in response to determination, by the controller 170, that a difference between the weight 212 of the cargo and the expected weight 226 of the cargo satisfies the weight difference threshold. In another implementation, the comparison unit 230 compares the center of gravity 214 (e.g., the controller 170 determined center of gravity) of the aircraft cargo 180 to the expected center of gravity 228 of the aircraft cargo 180. If a difference between the center of gravity 214 and the expected center of gravity 228 satisfies (e.g., is less than) the center of gravity threshold, the aircraft cargo 180 is accepted. Thus, the cargo is accepted in response to determination, by the controller 170, that a difference between the controller determined center of gravity 214 of the cargo and the expected center of gravity 228 of the cargo satisfies the center of gravity threshold. In yet another implementation, acceptance of the aircraft cargo 180 is based on the weight difference threshold and the center of gravity difference threshold. For example, the controller 170 accepts the aircraft cargo 180 in response to a first determination that the difference between the weight 212 and the expected weight 226 satisfies the weight difference threshold and in response to a second determination that the difference between the center of gravity 214 and the expected center of gravity 228 satisfies the center of gravity difference threshold.

The display device 232 is configured to display a notification 234 that indicates whether the aircraft cargo 180 is accepted. For example, if the controller 170 determines to accept the aircraft cargo 180 to be loaded into the compartment 174, the display device 232 displays a visual indicator (e.g., the notification 234) indicating that the aircraft cargo 180 has been accepted based on the weight 212, the center of gravity 214, or both.

In response to accepting the aircraft cargo 180, the controller 170 can enable the cargo transport system 172 to move the aircraft cargo 180 within the compartment 174. For example, a transport system controller 236 can generate an enable signal 238 that is provided to components of the cargo transport system 172. For example, the motive devices 115 of the cargo transport system 172 can be responsive to the enable signal 238 to move the aircraft cargo 180 over the cargo transport system 172 such that the aircraft cargo 180 is transported within the compartment 174.

If the aircraft cargo 180 is not accepted, the controller 172 is configured to generate an override prompt 242 to enable a crew member to override the decision not to accept the aircraft cargo 180. For example, an override controller 240 can generate the override prompt 242. In some implementations, the override prompt 242 is displayed at the display device 232. In response to the override prompt 242, a user (e.g. a member of the aircrew or ground crew) can provide user credentials 246 to the input device 244 to identify the aircraft cargo 180 as accepted. The user credentials 246 can include an employee identification number, employee initials, an override passcode, etc. The override controller 240 can authenticate the user credentials 246 entered by the user to verify that the user has permissions to override the rejection of the aircraft cargo 180.

Upon authenticating the user credentials 246, the override controller 240 can generate an override command 243 responsive to authentication of the user credentials 246 to accept the aircraft cargo 180. Responsive to the override command 243, the transport system controller 236 generates the enable signal 238 to move the aircraft cargo 180 over the cargo transport system 172 such that the aircraft cargo 180 is transported within the compartment 174. The override controller 240 can store the user credentials 246 with cargo manifest data (e.g., in the cargo manifest 222) to identify the user that authorized the acceptance of the aircraft cargo 180. If the aircraft cargo 180 is rejected and the user does not enter the user credentials 246 to override the rejection, additional actions may occur (e.g., removal of the aircraft cargo 180, collection of additional cargo fees from the provider of the aircraft cargo 180, etc.).

The controller 170 is configured to update a total weight 248 of aircraft cargo (e.g., a total weight of cargo) in the compartment 174 when cargo transport system 172 moves the aircraft cargo 180 into the compartment 174 upon acceptance of the aircraft cargo 180. Thus, the total weight 248 is based on the weight 212 of the aircraft cargo 180 and the weight of other cargo previously loaded in the compartment 174 via the aircraft cargo roller panel 100. Additionally, the controller 172 is configured to update an aggregate center of gravity 260 of at least one of the cargo in the compartment 174 or the aircraft. The controller 170 stores cargo data 250 at the memory 206, and the cargo data 250 indicates the total weight 248 of cargo in the compartment 174 and the aggregate center of gravity 260 of the cargo in the compartment 174 (or of the aircraft).

The flight data system 208 includes a comparator 252 and an output device 254. The comparator 252 is configured to perform a comparison of the total weight 248 of the cargo in the compartment 174 to flight parameter 256. According to this implementation, the flight parameters 256 indicate at least a maximum allowable weight in the compartment 172. Based on the comparison, the output device 254 generates an aircraft weight notification 258. The aircraft weight notification 258 indicates whether the maximum allowable weight in the compartment 172 has been exceeded. Additionally, the comparator 252 is configured to perform a second comparison of the aggregate center of gravity 260 to the flight parameters 256. According to this implementation, the flight parameters 256 also indicate a maximum offset for a center of gravity. Based on the second comparison, the output device 254 generates a center of gravity notification 262 (e.g., a second notification). The center of gravity notification 262 indicates whether the maximum offset for the center of gravity has been exceeded. Additionally, the flight data system 208 can recommend trim setting changes to the aircraft based on the aircraft weight notification 258, the center of gravity notification 262, or both.

The system 200 of FIG. 2 enables the controller 170 to verify whether the aircraft cargo 180 is compliant with reported parameters (e.g., the expected weight 226 of the aircraft cargo 180, the expected center of gravity 228 of the aircraft cargo 180, or both) on the cargo manifest 222. For example, based on a load experienced by each load cell 111, the controller 170 can determine the weight 212 of the aircraft cargo 180 and the center of gravity 214 of the aircraft cargo 180 while the aircraft cargo 180 is on the aircraft cargo roller panel 100. If the weight 212 and the center of gravity 214 are compliant with the expected weight 226 and the expected center of gravity 228 in the cargo manifest 222, the cargo transport system 172 transports the aircraft cargo 180 into the compartment 174. However, if the weight 212 or the center of gravity 214 is not compliant, a crew member may be alerted and additional actions may be taken. For example, the aircraft cargo 180 may be removed from the aircraft, additional cargo fees may be collected from the provider of the aircraft cargo 180 if the expected weight 226 was under-reported, etc.

FIG. 3A is a cross-sectional diagram of an aircraft 300 that includes a compartment 174B and a compartment 174A. An aircraft cargo roller panel 100A is located in the compartment 174A and has a similar configuration as the aircraft cargo roller panel 100, and aircraft cargo 180A is on the aircraft cargo roller panel 100A. The aircraft cargo 180A can be moved within the compartment 174A using the cargo transport system 172 described with respect to FIG. 1A. It should be understood that the location of the compartment 174A is for illustrative purposes only and should not be construed as limiting. In other implementations, the compartment 174A can be located on the same level as the compartment 174B or in other locations of the aircraft 300.

The aircraft 300 includes a door 302 that opens for entry into the compartment 174B. In the illustrated example of FIG. 3A, an aircraft cargo roller panel 100B is located in compartment 174B and has a similar configuration as the aircraft roller panel 100. For example, aircraft cargo 180B can be placed on the aircraft cargo roller panel 100B, and the controller 170 can determine parameters (e.g., a weight and a center of gravity) of the aircraft cargo 180B based on load cells coupled to the aircraft cargo roller panel 100B. In a similar manner as described with respect to FIG. 2, based on the parameters, the controller 170 can determine whether to accept the cargo 303.

FIG. 3B is a side-view diagram of the aircraft 300. The aircraft 300 includes the compartment 174A, the compartment 174B, and another compartment 174C. In the illustrative example of FIG. 3B, the compartment 174A is included in a forward cargo hold, and the compartment 174C is included in an aft cargo hold or a bulk hold.

According to one implementation, the controller 170 can receive signals from each aircraft cargo roller panel of the aircraft 300, such as the aircraft cargo roller panel 100A, the aircraft cargo roller panel 100B, etc. According to other implementations, each aircraft cargo roller panel 100A, 100B can be associated with a separate controller, and the controllers can provide information (e.g., report) to a master controller or a flight data system, such as the flight data system 208.

Figure 4:
FIG. 4 is a diagram of a cargo verification system display.

FIG. 4 is a diagram of a cargo verification system display 400. The cargo verification system display 400 can be displayed on display device 232 of FIG. 2. According to the cargo verification system display 400, the expected weight 226 of the aircraft cargo 180 is 12,060.40 pounds (lbs) and the weight 212 (e.g., the actual weight) is 13,446.40 lbs. Because the difference between the expected weight 226 and the weight 212 is greater than the weight difference threshold, a user (e.g., "John Doe") entered his employee identification number (e.g., "38792") to override a decision not to accept the aircraft cargo 180 based on the weight 212. In the example of FIG. 4, the expected center of gravity 228 for the aircraft cargo 180 is not specified in the cargo manifest 222. However, the aircraft cargo 180 is acceptable because the center of gravity 214 is within a percentage difference of the threshold (e.g., the center of gravity 214 is within 10% of the center of the aircraft cargo container or pallet).

After acceptance of the aircraft cargo 180, the cargo verification system display 400 indicates that the total weight 248 of the cargo in the compartment 174 (e.g., the "cargo hold") is 141,818.60 lbs. In the example of FIG. 4, the flight parameters 274 indicate that the expected total weight is 139,425 lbs. According to the cargo verification system display 400, the total weight 248 is acceptable because the total weight 248 is within a percentage difference of the expected total weight (e.g., the total weight 248 is within a two percent difference).

The cargo verification system display 400 provides a visual verification of whether the aircraft cargo 180 is compliant with reported parameters (e.g., the expected weight 226 of the aircraft cargo 180, the expected center of gravity 228 of the aircraft cargo 180, or both) on the cargo manifest 222. For example, based on a load experienced by each load cell 111, the controller 170 can determine the weight 212 of the aircraft cargo 180 and the center of gravity 214 of the aircraft cargo 180 while the aircraft cargo 180 is on the aircraft cargo roller panel 100. If the weight 212 and the center of gravity 214 are compliant with the expected weight 226 and the expected center of gravity 228 in the cargo manifest 222, the cargo transport system 172 transports the aircraft cargo 180 into the compartment 174. However, if the weight 212 or the center of gravity 214 is not compliant, a crew member may be alerted and additional actions may be taken. For example, the aircraft cargo 180 may be removed from the aircraft, additional cargo fees may be collected from the provider of the aircraft cargo 180 if the expected weight 226 was under-reported, etc.

Figure 5:
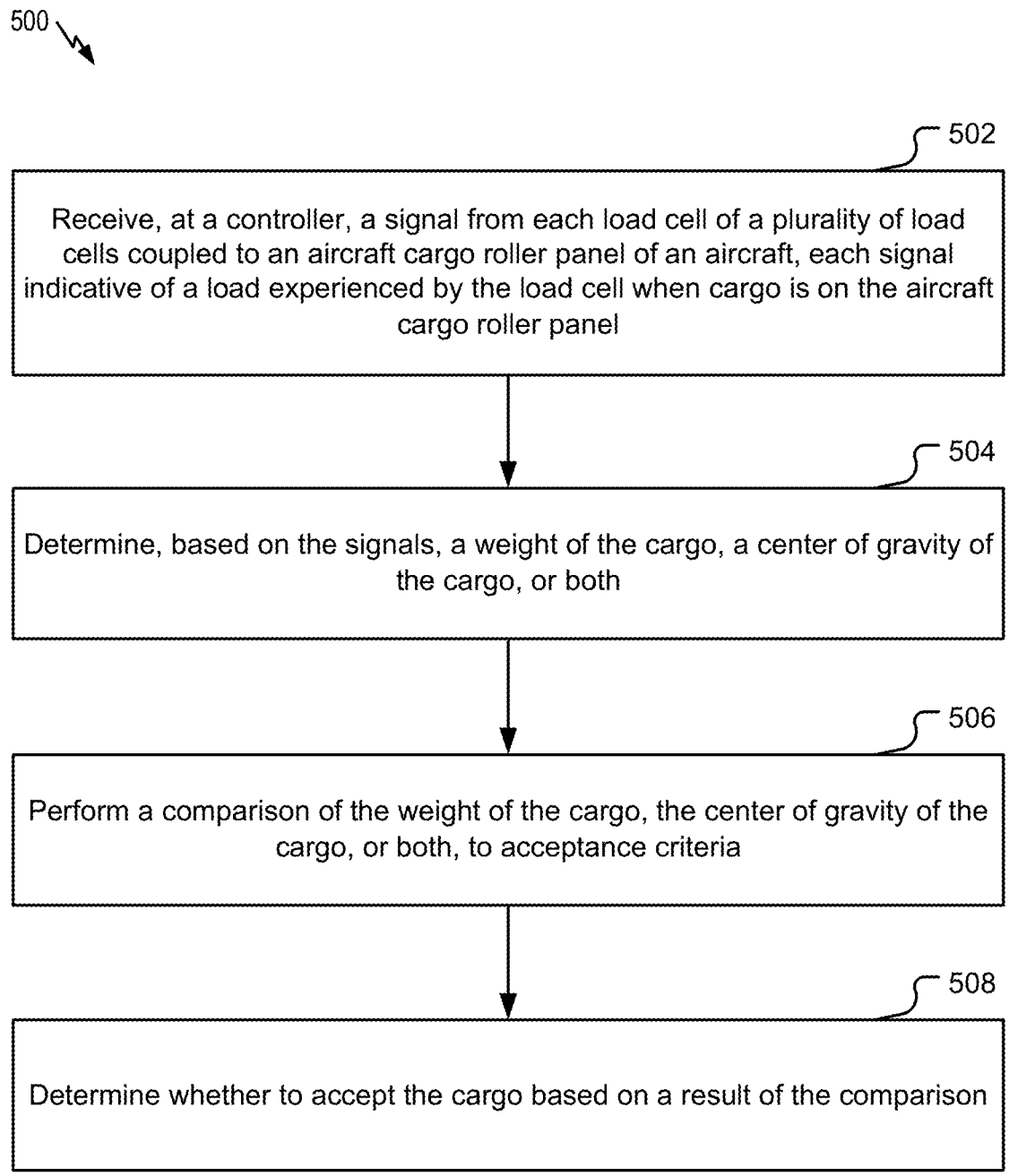
FIG. 5 is a flowchart of a method of determining parameters of aircraft cargo as the aircraft cargo is loaded in an aircraft.

FIG. 5 is a flowchart of a method 500 of determining parameters of aircraft cargo as the aircraft cargo is loaded in an aircraft. The method 500 may be performed by the controller 170.

The method 500 includes receiving, at a controller, a signal from each load cell of a plurality of load cells coupled to an aircraft cargo roller panel of an aircraft, at 502. Each signal is indicative of a load experienced by the load cell when cargo is on the aircraft cargo roller panel. For example, each load cell 111 coupled to the aircraft cargo roller panel 100 generates a signal 202 that is indicative of a load experienced by the load cell 111 when the aircraft cargo 180 is on the aircraft cargo roller panel 100. The signals 202 are provided to the controller 170.

The method 500 also includes determining, based on the signals, a weight of the cargo, a center of gravity of the cargo, or both, at 504. For example, the controller 170 determines the weight 212 and the center of gravity 214 of the aircraft cargo 180 based on the measured loads of the load cells 111. To illustrate, the cargo parameter determination unit 210 determines the sum of the loads experienced by the load cells 111 when the aircraft cargo 180 is placed on the aircraft cargo roller panel 100 to determine the weight 212. Additionally, the cargo parameter determination unit 210 uses the load cell position information to determine the center of gravity 214. For example, the cargo parameter determination unit 210 uses the load cell position information to determine the distance of each load cell 111 from the datum and multiplies the load experienced by each load cell 111 by the corresponding distance to determine the moment for each load cell 111. The sum of the moments can be divided by weight 212 to determine the distance between the datum and the center of gravity 214. The center of gravity 214 is determined based on the distance.

The method 500 also includes performing a comparison of the weight of the cargo, the center of gravity of the cargo, or both, to acceptance criteria, at 506. For example, the controller 170 performs a comparison of the weight 212 of the aircraft cargo 180, the center of gravity 214 of the aircraft cargo 180, or both, to acceptance criteria. The acceptance criteria can be based on the expected weight 226 of the aircraft cargo 180, the expected center of gravity 228 of the aircraft cargo 180, or both. As a non-limiting example, the acceptance criteria can include a weight difference threshold based on the expected weight 226 of the aircraft cargo 180. As another non-limiting example, the acceptance criteria can include a center of gravity difference threshold based on the expected center of gravity 228 of the aircraft cargo 180.

The method 500 also includes determining whether to accept the cargo based on a result of the comparison, at 508. For example, if a difference between the weight 212 and the expected weight 226 satisfies (e.g., is less than) the weight difference threshold, the aircraft cargo 180 is accepted. As another example, if a difference between the center of gravity 214 and the expected center of gravity 228 satisfies (e.g., is less than) the center of gravity threshold, the aircraft cargo 180 is accepted. As yet another example, the controller 170 accepts the aircraft cargo 180 in response to a first determination that the difference between the weight 212 and the expected weight 226 satisfies the weight difference threshold and in response to a second determination that the difference between the center of gravity 214 and the expected center of gravity 228 satisfies the center of gravity difference threshold.

The method 500 enables determination of whether the aircraft cargo 180 is compliant with reported parameters (e.g., the expected weight 226 of the aircraft cargo 180, the expected center of gravity 228 of the aircraft cargo 180, or both) on the cargo manifest 222. For example, based on a load experienced by each load cell 111, the controller 170 can determine the weight 212 of the aircraft cargo 180 and the center of gravity 214 of the aircraft cargo 180 while the aircraft cargo 180 is on the aircraft cargo roller panel 100. If the weight 212 and the center of gravity 214 are compliant with the expected weight 226 and the expected center of gravity 228 in the cargo manifest 222, the cargo transport system 172 transports the aircraft cargo 180 into the compartment 174. However, if the weight 212 or the center of gravity 214 is not compliant, crew may be alerted and additional actions may be taken. For example, the aircraft cargo 180 may be removed from the aircraft, additional cargo fees may be collected from the provider of the aircraft cargo 180 if the expected weight 226 was under-reported, etc.

Figure 6:
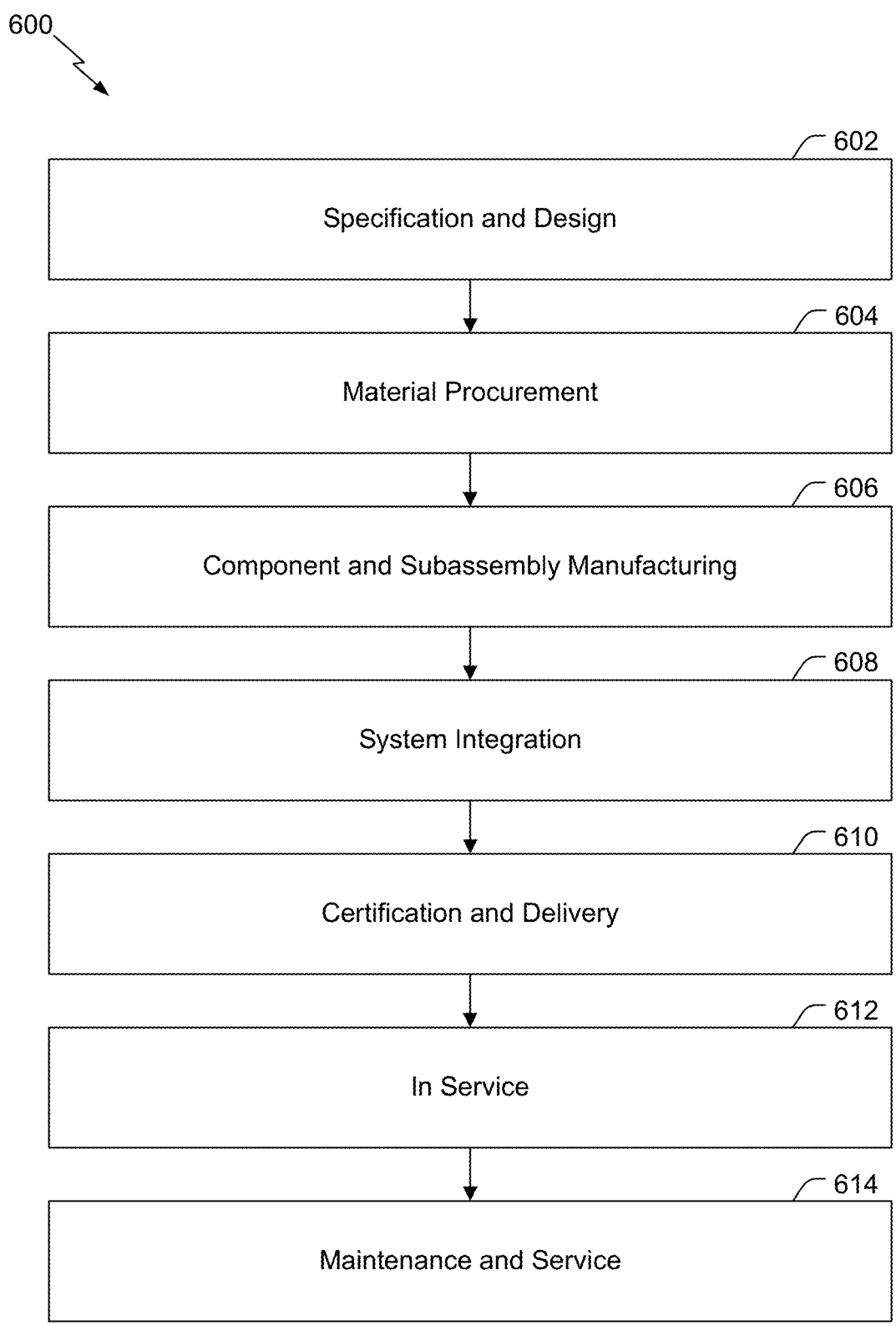
FIG. 6 is a flowchart of a method associated with the development and maintenance of a system to determine parameters of aircraft cargo as the aircraft cargo is loaded in an aircraft.
Figure 7:
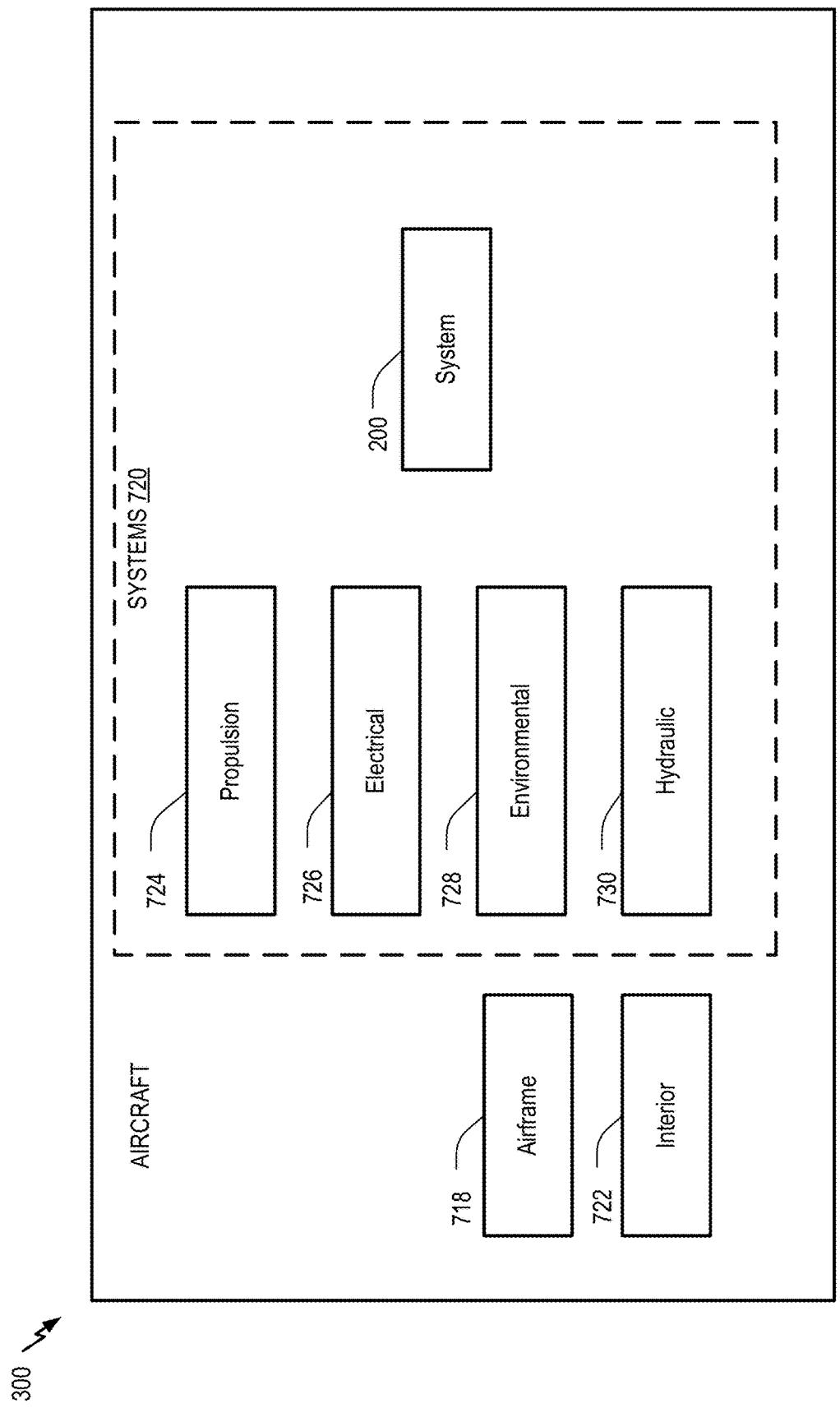
FIG. 7 is a block diagram of the aircraft including the system of FIG. 2.

Referring to FIGS. 6 and 7, examples of the disclosure are described in the context of an aircraft design, manufacturing, and service. FIG. 6 shows a flowchart illustrative of a method 600 associated with the aircraft cargo roller panel 100. During pre-production, the method 600 includes, at 602, specification and design of the aircraft cargo roller panel 100. At 604, the method 600 includes material procurement. For example, the method 600 includes procuring materials (such as materials for the aircraft cargo roller panel 100) for the aircraft 300.

During production, the method 600 includes, at 606, component and subassembly manufacturing and, at 608, system integration of the aircraft 300. The method 600 may include component and subassembly manufacturing of the aircraft cargo roller panel 100. At 610, the method 600 includes certification and delivery of the aircraft 300 and, at 612, placing the aircraft 300 in service. In some implementations, certification and delivery includes certifying the aircraft cargo roller panel 100. Placing the aircraft 300 in service may also include placing the aircraft cargo roller panel 100 in service. While in service, the aircraft 300 may be scheduled for routine maintenance and service (which may also include modification, reconfiguration, refurbishment, and so on). At 614, the method 600 includes performing maintenance and service on the aircraft 300. The method 600 may include performing maintenance and service on the aircraft cargo roller panel 100. For example, maintenance and service of the aircraft cargo roller panel 100 can include replacing the load cells 111, the controller 170, the motive devices, or a combination thereof.

FIG. 7 is a block diagram of an illustrative implementation of the aircraft 300 that includes the system 200. In at least one implementation, the aircraft 300 is produced by at least a portion of the method 600 of FIG. 6. As shown in FIG. 7, the aircraft 300 includes an airframe 718, a plurality of systems 720, and an interior 722. Examples of the plurality of systems 720 include one or more of a propulsion system 724, an electrical system 726, an environmental system 728, and a hydraulic system 730. The aircraft 300 also includes the system 200 of FIG. 2. Any number of other systems may be included in the aircraft 300. Although an aerospace example is shown, the present disclosure may be applied to other industries. For example, the system 200 can be used onboard another manned or unmanned vehicle (such as a satellite, a watercraft, or a land-based vehicle).

Apparatus and methods included herein may be employed during any one or more of the stages of the method 600 of FIG. 6. For example, components or subassemblies corresponding to production process 608 can be fabricated or manufactured in a manner similar to components or subassemblies produced while the aircraft 300 is in service, at 612 for example and without limitation. Also, one or more apparatus implementations, method implementations, or a combination thereof may be utilized during the production stages (e.g., stages 602-610 of the method 600), for example, by substantially expediting assembly of or reducing the cost of the aircraft 300. Similarly, one or more of apparatus implementations, method implementations, or a combination thereof may be utilized while the aircraft 300 is in service, for example and without limitation, to maintenance and service, at 614.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An aircraft comprising:
an aircraft cargo roller panel configured to facilitate loading aircraft cargo into a compartment of the aircraft;
a plurality of load cells coupled to the aircraft cargo roller panel, each load cell of the plurality of load cells configured to generate a signal indicative of a load experienced by the load cell when cargo is on the aircraft cargo roller panel; and
a controller configured to:
receive signals from the plurality of load cells;
determine, based on the signals, a center of gravity of the cargo;
perform a comparison of the center of gravity of the cargo to an expected center of gravity of the cargo; and
accept the cargo in response to the comparison by the controller, that a difference between the determined center of gravity of the cargo and the expected center of gravity of the cargo satisfies a center of gravity difference threshold.

2. The aircraft of claim 1, wherein the controller is further configured to:
perform a comparison of a weight of the cargo and the center of gravity of the cargo to acceptance criteria; and
based on a result of the comparison, determine whether to accept the cargo.

3. The aircraft of claim 2, further comprising a display device configured to display a notification that indicates whether the cargo is accepted.

4. The aircraft of claim 2, wherein the controller is configured to generate an override prompt based on a determination by the controller that the cargo is not accepted, wherein the override prompt enables a user to provide user credentials and to identify the cargo as accepted.

5. The aircraft of claim 4, wherein the controller is further configured to:
authenticate the user credentials;
generate an override command responsive to authentication of the user credentials; and
store the user credentials with cargo manifest data to identify the user that authorized acceptance of the cargo.

6. The aircraft of claim 2, wherein the cargo is accepted in response to a determination, by the controller, that a difference between the weight of the cargo and an expected weight of the cargo satisfies a weight difference threshold.

7. The aircraft of claim 2, wherein the cargo is accepted in response to a determination, by the controller, that a difference between the determined center of gravity of the cargo and an expected center of gravity of the cargo satisfies a center of gravity difference threshold.

8. The aircraft of claim 1, wherein the controller is configured to perform a comparison of the center of gravity of the cargo to an expected center of gravity of the cargo; and
accept the cargo in response to the comparison by the controller, that a difference between the determined center of gravity of the cargo and the expected center of gravity of the cargo satisfies a center of gravity difference threshold.

9. The aircraft of claim 8, wherein the controller is further configured to selectively enable the cargo transport system based on a weight of the cargo and the center of gravity of the cargo.

10. The aircraft of claim 1, further comprising:
a cargo identification device coupled to the controller and configured to send cargo identification data associated with the cargo to the controller,
wherein, based on the cargo identification data, the controller is configured to determine at least one of an expected weight of the cargo or an expected center of gravity of the cargo.

11. The aircraft of claim 10, wherein the cargo identification device includes a radio-frequency identification (RFID) tag scanner and the cargo includes an RFID tag, or the cargo identification device includes an optical scanner and the cargo includes a visible tag.

12. The aircraft of claim 11, wherein the controller is configured to access at least one of a cargo manifest or an electronic flight bag to determine the expected weight of the cargo, the expected center of gravity of the cargo, or both.

13. The aircraft of claim 1, wherein the aircraft cargo roller panel comprises at least two sub-panels, each sub-panel comprising at least one load cell of the plurality of load cells.

14. The aircraft of claim 1, further comprising a memory coupled to the controller, wherein the controller is configured to store cargo data at the memory, the cargo data indicating a total weight of cargo in the compartment based on the weight of the cargo and based on weights of other cargo previously loaded in the compartment via the aircraft cargo roller panel.

15. The aircraft of claim 14, further comprising a flight data system coupled to the memory, the flight data system configured to:
perform a comparison of the total weight of cargo in the compartment to flight parameters; and
output an aircraft weight notification based on the comparison.

16. The aircraft of claim 15, wherein the controller is further configured to estimate an aggregate center of gravity of at least one of the cargo in the compartment or the aircraft including the cargo in the compartment, and the flight data system is configured to:
perform a second comparison of the aggregate center of gravity to the flight parameters; and
output a second notification based on the second comparison.

17. A method comprising:
receiving, at a controller, a signal from each load cell of a plurality of load cells coupled to an aircraft cargo roller panel of an aircraft, each signal indicative of a load experienced by the load cell when cargo is on the aircraft cargo roller panel;
determining, based on the signals, a center of gravity of the cargo;
performing a comparison of the center of gravity of the cargo to an expected center of gravity of the cargo; and
accepting the cargo in response to the comparison by the controller, that a difference between the determined center of gravity of the cargo and the expected center of gravity of the cargo satisfies a center of gravity difference threshold.

18. The method of claim 17, further comprising:
performing a comparison of a weight of the cargo and a center of gravity of the cargo to acceptance criteria; and
determining whether to accept the cargo based on a result of the comparison.

19. The method of claim 17, wherein the cargo is accepted in response to a determination, by the controller, that a difference between the weight of the cargo and an expected weight of the cargo satisfies a weight difference threshold.

20. An aircraft cargo roller panel comprising:
  a plurality of omnidirectional rollers configured to facilitate loading aircraft cargo into a compartment of an aircraft;
  a plurality of load cells, each load cell of the plurality of load cells configured to generate a load signal indicative of a load experienced by the load cell when cargo is on the plurality of omnidirectional rollers and to send the load signal to a controller; and
  one or more motive devices configured to selectively engage, responsive to a control signal from the controller that indicates a center of gravity is below a threshold, the cargo to move the cargo within the compartment, the control signal generated responsive to the load signals.

* * * * *